United States Patent
Buslepp et al.

(10) Patent No.: US 7,726,281 B2
(45) Date of Patent: Jun. 1, 2010

(54) CYLINDER PRESSURE SENSOR DIAGNOSTIC SYSTEM AND METHOD

(75) Inventors: Kenneth J. Buslepp, Brighton, MI (US); Douglas R. Verner, Sterling Heights, MI (US); Joseph R. Dulzo, Novi, MI (US); David S. Mathews, Howell, MI (US)

(73) Assignee: GM Global Technology Operations, Inc.

( * ) Notice: Subject to any disclaimer, the term of this patent is extended or adjusted under 35 U.S.C. 154(b) by 43 days.

(21) Appl. No.: 12/250,956

(22) Filed: Oct. 14, 2008

(65) Prior Publication Data

US 2009/0043475 A1 Feb. 12, 2009

Related U.S. Application Data

(63) Continuation-in-part of application No. 11/432,446, filed on May 11, 2006, now Pat. No. 7,500,470.

(60) Provisional application No. 61/056,984, filed on May 29, 2008.

(51) Int. Cl.
F02P 5/00 (2006.01)
F02M 7/00 (2006.01)
G01L 15/00 (2006.01)

(52) U.S. Cl. ............... 123/406.22; 123/406.23; 123/435; 73/114.11; 73/114.16

(58) Field of Classification Search .......... 123/334, 123/335, 435, 436, 406.22, 406.23, 406.24, 123/406.25; 701/101, 114.5; 73/35.12, 114.02, 73/114.11, 114.16–114.18, 114.22, 114.26–114.27
See application file for complete search history.

(56) References Cited

U.S. PATENT DOCUMENTS

| | | | | | |
|---|---|---|---|---|---|
| 4,337,647 | A | * | 7/1982 | Radcliffe et al. | 73/114.11 |
| 4,406,265 | A | * | 9/1983 | Brandt et al. | 123/406.42 |
| 4,417,556 | A | * | 11/1983 | Latsch | 123/406.42 |
| 4,744,244 | A | * | 5/1988 | Tanaka | 73/114.16 |
| 4,984,546 | A | * | 1/1991 | Shimomura et al. | 123/406.23 |
| 5,058,552 | A | * | 10/1991 | Shimomura et al. | 123/406.23 |
| 5,699,252 | A | * | 12/1997 | Citron et al. | 701/111 |
| 5,740,780 | A | * | 4/1998 | Shimizu et al. | 123/406.22 |
| 5,758,309 | A | * | 5/1998 | Satoh | 701/108 |
| 5,771,482 | A | * | 6/1998 | Rizzoni | 701/101 |
| 6,530,358 | B2 | * | 3/2003 | Kalweit et al. | 123/295 |
| 6,935,313 | B2 | * | 8/2005 | Jacobson | 123/434 |
| 7,073,485 | B2 | * | 7/2006 | Truscott et al. | 123/406.22 |
| 7,113,861 | B2 | * | 9/2006 | Jacobson | 701/101 |
| 7,117,082 | B2 | * | 10/2006 | Kohira et al. | 701/114 |

(Continued)

OTHER PUBLICATIONS

U.S. Appl. No. 11/432,446, filed May 11, 2006, Kenneth J. Buslepp.

*Primary Examiner*—Thomas N Moulis

(57) ABSTRACT

A control module comprising a cylinder torque determination module that determines an indicated torque for a cylinder in an engine based on a pressure in the cylinder, a cylinder torque balancing module that determines a derivative term for the cylinder based on rotation of a crankshaft, and a cylinder pressure error detection module that detects a pressure error for the cylinder based on the indicated torque and the derivative term. A method comprising determining an indicated torque for a cylinder in an engine based on a pressure in the cylinder, determining a derivative term for the cylinder based on rotation of a crankshaft, and detecting a pressure error for the cylinder based on the indicated torque and the derivative term.

20 Claims, 5 Drawing Sheets

U.S. PATENT DOCUMENTS

| | | | |
|---|---|---|---|
| 7,454,286 B2 * | 11/2008 | Sinnamon et al. | 701/110 |
| 7,500,470 B2 * | 3/2009 | Buslepp et al. | 123/436 |
| 7,623,955 B1 * | 11/2009 | Rackmil et al. | 701/115 |
| 2005/0193804 A1 * | 9/2005 | Kokubo | 73/35.12 |
| 2005/0229903 A1 * | 10/2005 | Kobayashi et al. | 123/435 |
| 2006/0086176 A1 * | 4/2006 | Piewek et al. | 73/35.12 |
| 2008/0173070 A1 * | 7/2008 | Kassner | 73/35.12 |
| 2009/0132144 A1 * | 5/2009 | Shinozaki et al. | 701/102 |

* cited by examiner

US 7,726,281 B2

CYLINDER PRESSURE SENSOR DIAGNOSTIC SYSTEM AND METHOD

CROSS-REFERENCE TO RELATED APPLICATIONS

This application is a continuation-in-part of U.S. patent application Ser. No. 11/432,446 filed on May 11, 2006.

This application claims the benefit of U.S. Provisional Application No. 61/056,984, filed on May 29, 2008. The disclosures of the above applications are incorporated herein by reference in its entirety.

FIELD

The present invention relates to internal combustion engines, and more particularly to detecting pressure measurement errors in a cylinder of an internal combustion engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines create drive torque that is transferred to a drivetrain via a crankshaft. More specifically, air is drawn into an engine and is mixed with fuel therein. The air and fuel mixture is combusted within cylinders to drive pistons. The pistons drive the crankshaft, which generates drive torque.

A cylinder pressure sensor generates a cylinder pressure signal based on the pressure in the cylinder. A control module determines a cylinder pressure from the cylinder pressure signal. Cylinder pressure is used to control one or more subsystems within the vehicle. Cylinder pressure sensors may lose accuracy due to contamination from combustion byproducts. Errors in the cylinder pressure can cause inaccurate cylinder pressure computations and therefore may cause one or more vehicle subsystems to operate inefficiently.

SUMMARY

Accordingly, the present disclosure provides a control module comprising a cylinder torque determination module that determines an indicated torque for a cylinder in an engine based on a pressure in the cylinder, a cylinder torque balancing module that determines a derivative term for the cylinder based on rotation of a crankshaft, and a cylinder pressure error detection module that detects a pressure error for the cylinder based on the indicated torque and the derivative term. In addition, the present disclosure provides a method comprising determining an indicated torque for a cylinder in an engine based on a pressure in the cylinder, determining a derivative term for the cylinder based on rotation of a crankshaft, and detecting a pressure error for the cylinder based on the indicated torque and the derivative term.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
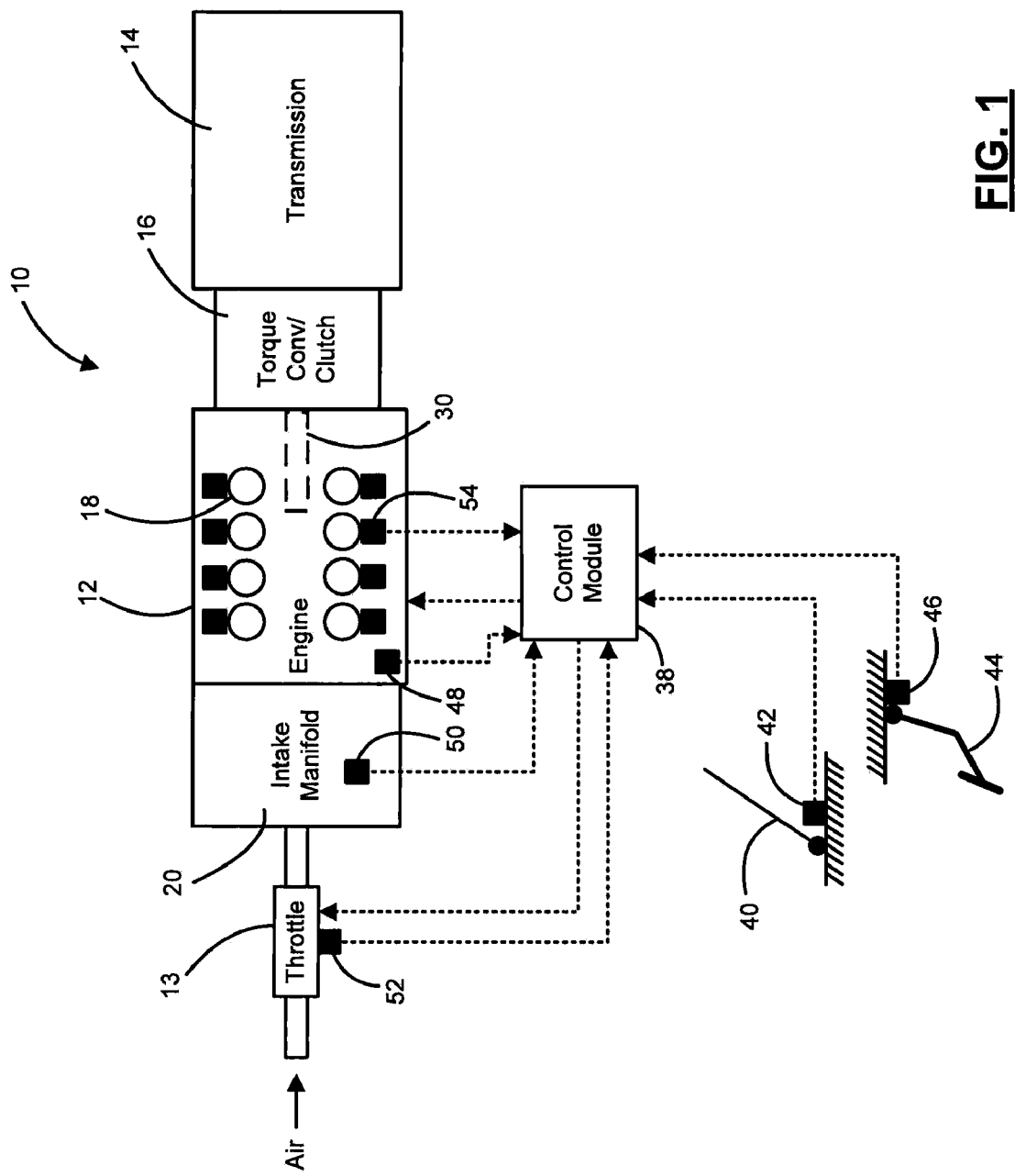
FIG. 1 is a functional block diagram illustrating an exemplary vehicle that is regulated based on the cylinder pressure sensor diagnostic control system and method of the present invention.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. Although FIG. 1 depicts eight cylinders (N=8), it is appreciated that the engine 12 may include additional or fewer cylinders 18. For example, engines having 4, 5, 6, 8, 10, 12, and 16 cylinders are contemplated. Air flows into the engine 12 through an intake manifold 20 and is combusted with fuel in the cylinders 18. The combustion process reciprocally drives pistons (not shown) within the cylinders 18. The pistons rotatably drive a crankshaft 30 to provide drive torque to the powertrain.

A control module 38 communicates with the engine 12 and various inputs and sensors as described herein. A vehicle operator actuates an accelerator pedal 40 to regulate the throttle 13. More particularly, a pedal position sensor 42 generates a pedal position signal that is communicated to the control module 38. The control module 38 generates a throttle control signal based on the pedal position signal. A throttle actuator (not shown) adjusts the throttle 13 based on the throttle control signal to regulate airflow into the engine 12.

The vehicle operator actuates a brake pedal 44 to regulate vehicle braking. More particularly, a brake position sensor 46 generates a brake pedal position signal that is communicated to the control module 38. The control module 38 generates a brake control signal based on the brake pedal position signal. A brake system (not shown) adjusts vehicle braking based on the brake control signal to regulate vehicle speed. An intake manifold absolute pressure (MAP) sensor 50 generates a signal based on a pressure of the intake manifold 20. A throttle position sensor (TPS) 52 generates a signal based on throttle position. Cylinder pressure sensors 54 generate a signal based on a pressure in cylinders 18.

A crankshaft rotation sensor 48 generates a signal based on rotation of the crankshaft 30, which can be used to calculate engine speed. More specifically, the engine includes a crankshaft rotation mechanism (not shown), and the crankshaft rotation sensor 48 is responsive to the crankshaft rotation mechanism. In one example, the crankshaft rotation mechanism includes a toothed wheel that is fixed for rotation with the crankshaft 30. The crankshaft rotation sensor 48 is responsive to the rising and falling edges of the teeth. An exemplary toothed wheel includes 58 teeth that are equally spaced about the circumference of the wheel, except in one location where two teeth are missing to provide a gap. Therefore, the gap accounts for approximately 12° of crankshaft rotation and each tooth accounts for approximately 6° of crankshaft rotation. The control module 38 determines engine RPM based on the time it takes for a pre-determined number of teeth to pass.

A cylinder torque balancing control system and method incorporated in the cylinder pressure sensor diagnostic control system and method of the present invention identifies weak cylinders based on rotation of a crankshaft and balances the cylinder torque output across the cylinders. More specifically, an average derivative term ($DT_{AVG}$) is calculated for each cylinder based on crankshaft speed during the expansion stroke of the cylinder and the magnitude of $DT_{AVG}$ is used to identify weak cylinders.

$DT_{AVG}$ is determined based on first and second crankshaft speed derivatives FD and SD, respectively. As used herein, k is the recovery cylinder, which fires after the monitored cylinder k−1 (i.e., the recovery cylinder is next in the firing order after the monitored cylinder). FD is determined for a monitored cylinder k−1 ($FD_{k-1}$) based on the time it takes for the crankshaft 30 to rotate a predetermined angle (e.g., 90°) during the expansion stroke of each cylinder, designated as $t_{CS}$. $t_{CS}$ is monitored via the crankshaft signal generated by the crankshaft rotation sensor 48. SD is determined for both the recovery cylinder (i.e., the currently firing cylinder) and the monitored cylinder, which are provided as $SD_k$ and $SD_{k-1}$, respectively. A derivative term (DT) for a particular cylinder is determined based on $FD_{k-1}$, $SD_k$ and $SD_{k-1}$. DT is sampled over several engine cycles and $DT_{AVG}$ is determined as the average thereof.

The pressure sensor diagnostic system and method of the present invention determines an indicated torque (TQ) for each of the cylinders 18 based on a pressure (P) in each cylinder and compares a TQ variation between a particular cylinder and at least one other cylinder in the engine 12 to a $DT_{AVG}$ variation between the particular cylinder and the other cylinder(s) to determine whether TQ correlates with $DT_{AVG}$. When TQ does not correlate with $DT_{AVG}$, the pressure sensor diagnostic system and method detects a cylinder pressure error for the particular cylinder.

Figure 2:
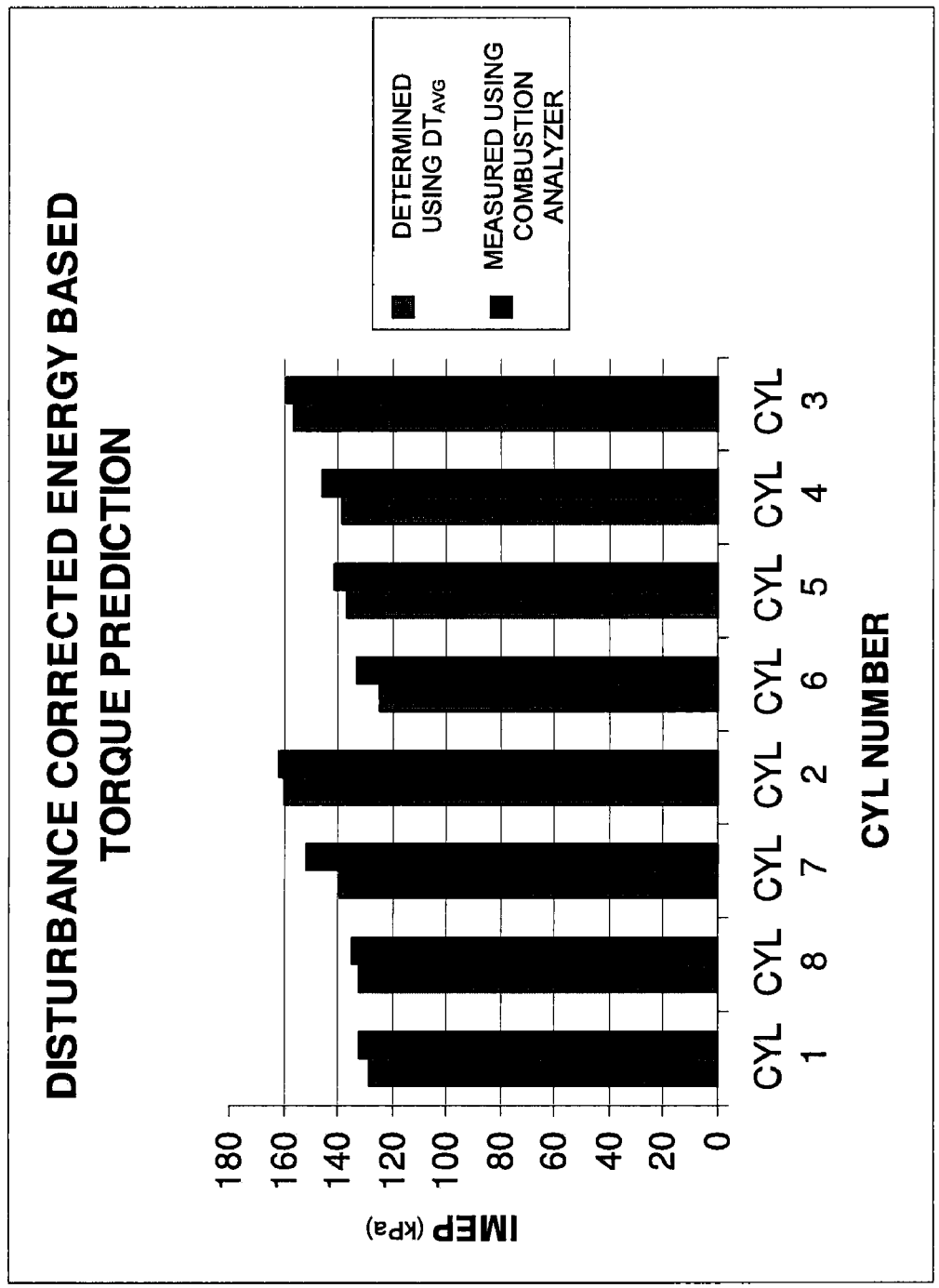
FIG. 2 is a graph comparing exemplary measured pressures for cylinders of the exemplary engine of FIG. 1 to those determined based on the cylinder pressure sensor diagnostic control system and method of the present invention.

Referring now to FIG. 2, a graph compares exemplary measured cylinder pressures for an 8-cylinder engine to those determined based on the cylinder pressure sensor diagnostic control system and method of the present invention. The x-axis represents a cylinder number in the engine 12 and the y-axis represents a corresponding indicated mean effective pressure (IMEP). IMEP is the difference between the cylinder pressure over an expansion cycle and the cylinder pressure over a compression cycle. IMEP indicates a torque produced by a cylinder.

A pair of vertical bars represents IMEP for each cylinder. In each pair, the left vertical bar represents IMEP determined based on the cylinder pressure sensor diagnostic, while the right vertical bar represents IMEP measured using a combustion analyzer. Although the cylinder pressure sensor diagnostic compares a cylinder-to-cylinder TQ variation to a cylinder-to-cylinder $DT_{AVG}$ variation to determine whether a cylinder pressure error exists, an absolute IMEP may be approximated using $DT_{AVG}$ and a torque model that correlates $DT_{AVG}$ with IMEP. Comparing the determined IMEP cylinder-to-cylinder variation with the measured IMEP cylinder-to-cylinder variation demonstrates the ability to detect a cylinder-to-cylinder TQ variation within 20 kPa accuracy using $DT_{AVG}$.

Figure 3:
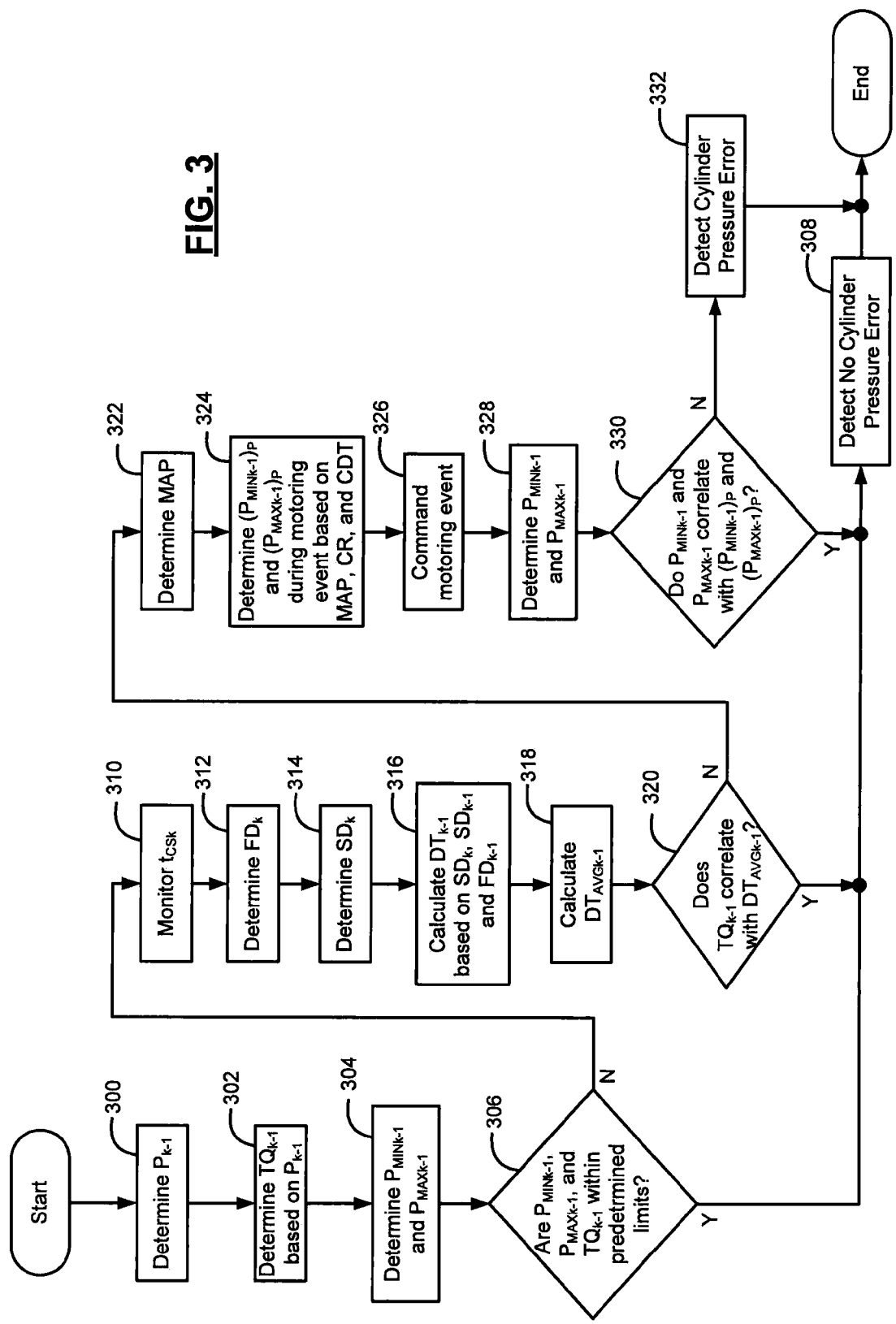
FIG. 3 is a flowchart illustrating exemplary steps executed by the cylinder pressure sensor diagnostic control system and method of the present invention.

Referring now to FIG. 3, exemplary steps executed by the cylinder pressure sensor diagnostic control system and method will be described in detail. In steps 300, control determines a pressure for the monitored cylinder ($P_{k-1}$) based on a signal received from the cylinder pressure sensors 54. In step 302, control determines an indicated torque for the monitored cylinder ($TQ_{k-1}$) based on $P_{k-1}$. $TQ_{k-1}$ is the base mean effective pressure (BMEP), or the difference between IMEP and a loss due to pumping work and friction. In step 304, control determines minimum and maximum pressures for the monitored cylinder, respectively provided as $P_{MINk-1}$ and $P_{MAXk-1}$, based on $P_{k-1}$.

In step 306, control determines whether $P_{MAXk-1}$, $P_{MINk-1}$, and $TQ_{k-1}$ are within predetermined limits. When $P_{MAXk-1}$, $P_{MINk-1}$, and $TQ_{k-1}$ are within predetermined limits, control detects no cylinder pressure error for the monitored cylinder in step 308. When $P_{MAXk-1}$, $P_{MINk-1}$, and $TQ_{k-1}$ are not within predetermined limits, control monitors $t_{CSk}$ for the recovery cylinder in step 310. In steps 312 and 314, control determines $FD_k$ and $SD_k$, respectively. Control determines $DT_{k-1}$ (i.e., DT for the monitored cylinder k−1) based on $SD_k$, $SD_{k-1}$ and $FD_{k-1}$, in step 316. $SD_{k-1}$ and $FD_{k-1}$ are provided from a buffer and are determine in a previous iteration. In step 318, control determines $DT_{AVGk-1}$ (i.e., $DT_{AVG}$ for the monitored cylinder k−1) based on $DT_{k-1}$.

In step 320, control determines whether $TQ_{k-1}$ correlates with $DT_{AVGk-1}$. When $TQ_{k-1}$ correlates with $DT_{AVGk-1}$, control detects no cylinder pressure error for the monitored cylinder in step 308. When $TQ_{k-1}$ does not correlate with $DT_{AVGk-1}$, control determines MAP based on the signal from the MAP sensor 50 in step 322. In step 324, control determines $(P_{MINk-1})_P$ and $(P_{MAXk-1})_P$ (i.e., predicted $P_{MIN}$ and $P_{MAX}$ for the monitored cylinder k−1) during a motoring event based on the MAP, a compression ratio (CR), and a predetermined degradation term (PDT). The CR is a ratio of the cylinder volume when the piston is at the top of its stroke and the cylinder volume when the piston is at the bottom of its stroke. The PDT is based on pressure sensor measurements observed during a durability cycle. In step 326, control commands the motoring event, which inhibits a spark in the monitored cylinder. The motoring event may be commanded at a time that is least objectionable for overall drivability of the vehicle 10, such as a deceleration cycle of the engine 12. In step 328, control determines $P_{MINk-1}$ and $P_{MAXk-1}$ during the motoring event.

In step 330, control determines whether $P_{MINk-1}$ and $P_{MAXk-1}$, correlate with $(P_{MINk})_P$ and $(P_{MAXk})_P$, respectively. When $P_{MINk-1}$ and $P_{MAXk-1}$ correlate with $(P_{MINk-1})_P$ and $(P_{MAXk-1})_P$, control detects no cylinder pressure error for the monitored cylinder in step 308. When $P_{MINk-1}$ and $P_{MAXk-1}$ do not correlate with $(P_{MINk-1})_P$ and $(P_{MAXk-1})_P$, control detects a cylinder pressure error for the monitored cylinder in step 332.

Figure 4:
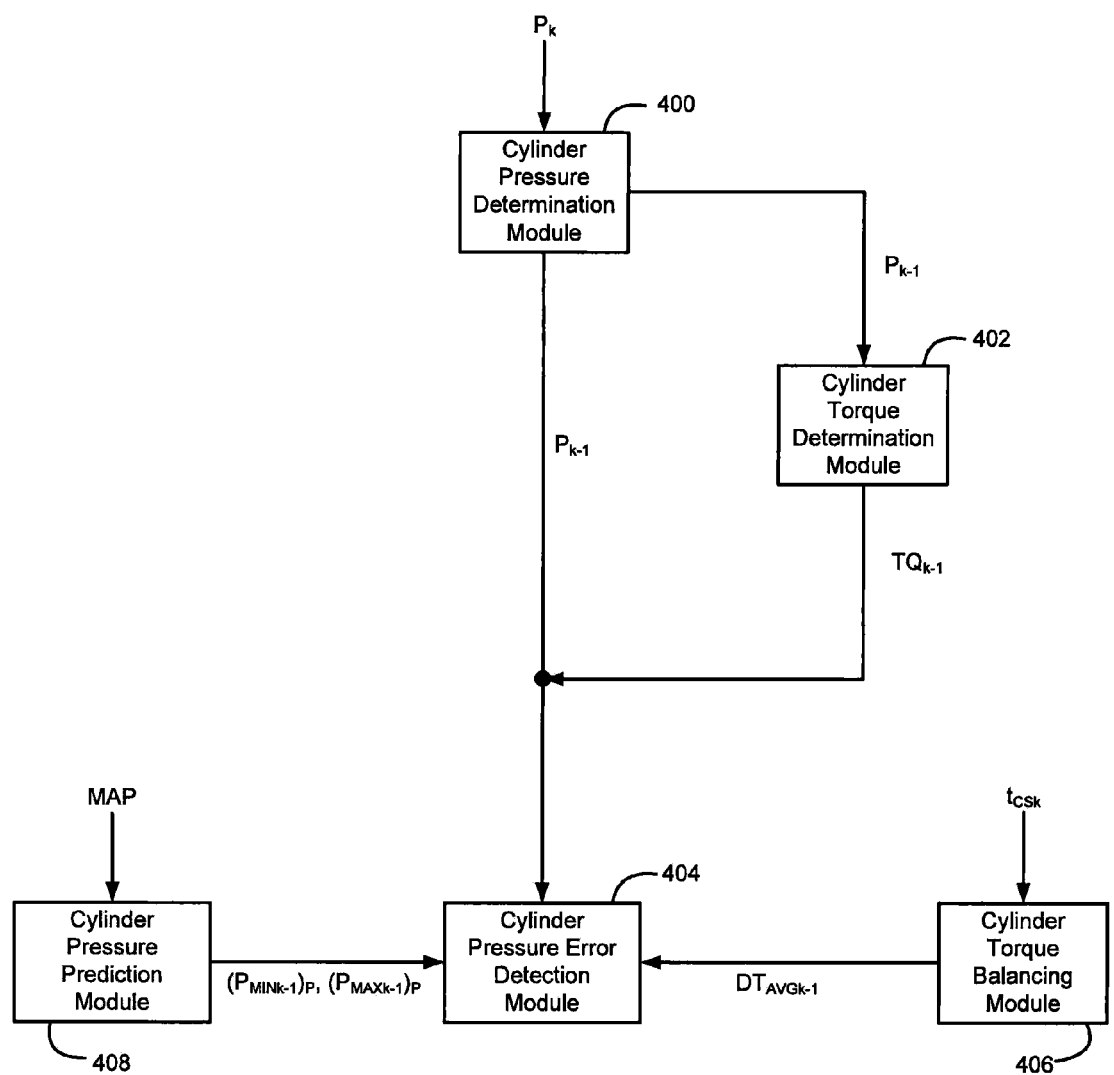
FIG. 4 is a functional block diagram illustrating exemplary modules that execute the cylinder pressure sensor diagnostic control system and method of the present invention.

Referring now to FIG. 4, exemplary modules that execute the cylinder pressure sensor diagnostic control system and method will be described in detail. The exemplary modules include a cylinder pressure determination module 400, a cylinder torque determination module 402, a cylinder pressure error detection module 404, a cylinder torque balancing module 406, and a cylinder pressure prediction module 408. The cylinder pressure determination module 400 receives a signal representing $P_{k-1}$ from the pressure sensors 54 and determines $P_{k-1}$ based thereon. $P_{k-1}$ is output to the cylinder torque determination module 402 and the cylinder pressure error determination module 404. The cylinder torque determination module 402 determines $TQ_{k-1}$ based on $P_{k-1}$. $TQ_{k-1}$ is output to the cylinder pressure error detection module 404.

The cylinder pressure error detection module 404 determines $P_{MINk-1}$ and $P_{MAXk-1}$ based on $P_{k-1}$. The cylinder torque balancing module 406 receives $t_{CSk}$ and determines $DT_{AVGk-1}$ based thereon. $DT_{AVGk-1}$ is output to the cylinder pressure error determination module 404. The cylinder pressure prediction module 408 receives MAP and determines $(P_{MINk-1})_P$ and $(P_{MAXk-1})_P$ during a motoring event based on the MAP, CR, and PDT. $(P_{MINk-1})_P$ and $(P_{MAXk-1})_P$ are output to the cylinder pressure error detection module 404. The cylinder pressure error detection module 404 detects a cylinder pressure error when $P_{MINk-1}$, $P_{MAXk-1}$, and $TQ_{k-1}$ are not within predetermined limits, $TQ_{k-1}$ does not correlate with $DT_{AVGk-1}$, and $P_{MINk-1}$ and $P_{MAXk-1}$ do not correlate with $(P_{MINk-1})_P$ and $(P_{MAXk-1})_P$ during a motoring event.

Figure 5:
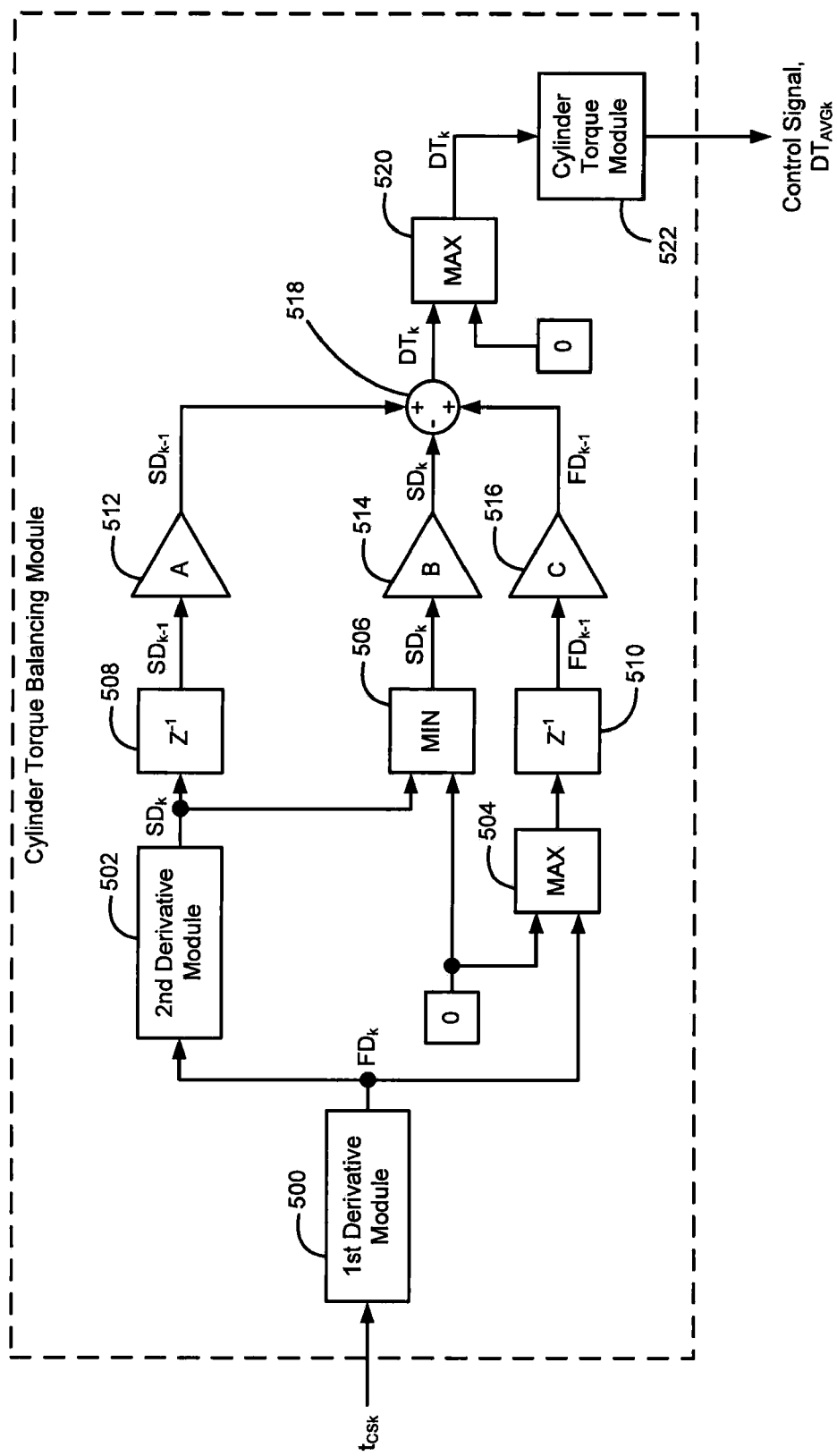
FIG. 5 is a functional block diagram illustrating exemplary modules that execute a cylinder torque balancing control system and method incorporated in the cylinder pressure sensor diagnostic control system and method of the present invention.

Referring now to FIG. 5, exemplary modules that execute the cylinder torque balancing control system and method incorporated in the cylinder pressure sensor diagnostic control system and method will be described in detail. The exemplary modules include first and second derivative modules 500, 502, maximum and minimum modules 504, 506, buffer modules 508, 510, gain modules 512, 514, 516, a summer 518, a maximum module 520 and a cylinder torque module 522. The first derivative module 500 receives $t_{CSk}$ and determines $FD_k$ based thereon. $FD_k$ is output to the second derivative module 502 and the maximum module 504. The second derivative module 502 determines $SD_k$ based on $FD_k$ and outputs $SD_k$ to the minimum module 506 and the buffer module 508.

The maximum module 504 clamps $FD_k$ and the minimum module 506 clamps $SD_k$ to minimize noise. The buffer modules 508, 510 output $SD_{k-1}$ and $FD_{k-1}$ to the gain modules 512, 516, respectively, and the minimum module 506 outputs $SD_k$ to the gain module 514. The gain modules 512, 514, 516 multiply $SD_{k-1}$, $SD_k$ and $FD_{k-1}$ by respective gains A, B and C. The gains can be used to adjust the influence or weight of a particular derivative (i.e., $SD_{k-1}$, $SD_k$ and $FD_{k-1}$) or to turn OFF a derivative (e.g., gain set equal to 0).

The summer 518 sums $FD_{k-1}$ and $SD_{k-1}$ and subtracts $SD_k$ to provide $DT_{k-1}$. $DT_{k-1}$ is output to the maximum module 520, which clamps $DT_{k-1}$ to minimize noise. $DT_{k-1}$ is output to the cylinder torque module 522, which calculates $DT_{AVG}$ for each cylinder and generates control signals to regulate the torque output of the individual cylinders.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module, comprising:
   a cylinder torque determination module that determines an indicated torque for a cylinder in an engine based on a pressure in said cylinder;
   a cylinder torque balancing module that determines a derivative term for said cylinder based on rotation of a crankshaft; and
   a cylinder pressure error detection module that detects a pressure error for said cylinder based on said indicated torque and said derivative term.

2. The control module of claim 1 wherein said indicated torque and said derivative term are determined when said engine is operating at an idle speed and said derivative term is averaged over several engine cycles.

3. The control module of claim 1 further comprising:
   a first derivative module that determines a first derivative for a monitored cylinder and a recovery cylinder based on said rotation of said crankshaft; and
   a second derivative module that determines a second derivative for said monitored cylinder and said recovery cylinder based on said first derivative, wherein said derivative term is determined for said monitored cylinder based on said first derivative determined for said monitored cylinder and said second derivative determined for said monitored cylinder and said recovery cylinder.

4. The control module of claim 1 wherein said cylinder pressure error detection module detects said pressure error when said indicated torque does not correlate with said derivative term.

5. The control module of claim 4 wherein said cylinder pressure error detection module determines minimum and maximum pressures in said cylinder and determines whether said indicated torque correlates with said derivative term when said minimum and maximum pressures and said indicated torque are not within a predetermined limit.

6. The control module of claim 4 wherein said cylinder pressure error detection module compares an indicated torque variation between a monitored cylinder and at least one other cylinder with a derivative term variation between said monitored cylinder and said at least one other cylinder to determine whether said indicated torque correlates with said derivative term determined for said monitored cylinder.

7. The control module of claim 1 further comprising:
   a cylinder pressure error detection module that determines actual minimum and maximum pressures in said cylinder during a motoring event; and
   a cylinder pressure prediction module that determines predicted minimum and maximum pressures in said cylinder during said motoring event based on a manifold absolute pressure, a compression ratio, and a predetermined pressure degradation term.

8. The control module of claim 7 wherein said cylinder pressure error detection module detects said pressure error if said predicted minimum and maximum pressures do not correlate with said actual minimum and maximum pressures.

9. The control module of claim 7 wherein said motoring event involves inhibiting a spark in said cylinder.

10. The control module of claim 7 wherein said motoring event is commanded during a deceleration cycle of said engine.

11. A method, comprising:
- determining an indicated torque for a cylinder in an engine based on a pressure in said cylinder;
- determining a derivative term for said cylinder based on rotation of a crankshaft; and
- detecting a pressure error for said cylinder based on said indicated torque and said derivative term.

12. The method of claim 11 further comprising determining said indicated torque and said derivative term when said engine is operating at an idle speed and averaging said derivative term over several engine cycles.

13. The method of claim 11 further comprising:
- determining a first derivative for a monitored cylinder and a recovery cylinder based on said rotation of said crankshaft; and
- determining a second derivative for said monitored cylinder and said recovery cylinder based on said first derivative, wherein said derivative term is determined for said monitored cylinder based on said first derivative determined for said monitored cylinder and said second derivative determined for said monitored cylinder and said recovery cylinder.

14. The method of claim 11 further comprising detecting said pressure error when said indicated torque does not correlate with said derivative term.

15. The method of claim 14 further comprising determining minimum and maximum pressures in said cylinder and determining whether said indicated torque correlates with said derivative term when said minimum and maximum pressures and said indicated torque are not within a predetermined limit.

16. The method of claim 14 further comprising comparing an indicated torque variation between a monitored cylinder and at least one other cylinder with a derivative term variation between said monitored cylinder and said at least one other cylinder to determine whether said indicated torque correlates with said derivative term determined for said monitored cylinder.

17. The method of claim 11 further comprising:
- determining actual minimum and maximum pressures in said cylinder during a motoring event; and
- determining predicted minimum and maximum pressures in said cylinder during said motoring event based on a manifold absolute pressure, a compression ratio, and a predetermined pressure degradation term.

18. The method of claim 17 further comprising detecting said pressure error if said predicted minimum and maximum pressures do not correlate with said actual minimum and maximum pressures.

19. The method of claim 17 further comprising inhibiting a spark in said cylinder during said motoring event.

20. The method of claim 17 further comprising commanding said motoring event during a deceleration cycle of said engine.

* * * * *